D. T. BROWNLEE.
GEARED-UP STARTER.
APPLICATION FILED JUNE 5, 1914.
1,156,863.
Patented Oct. 12, 1915.
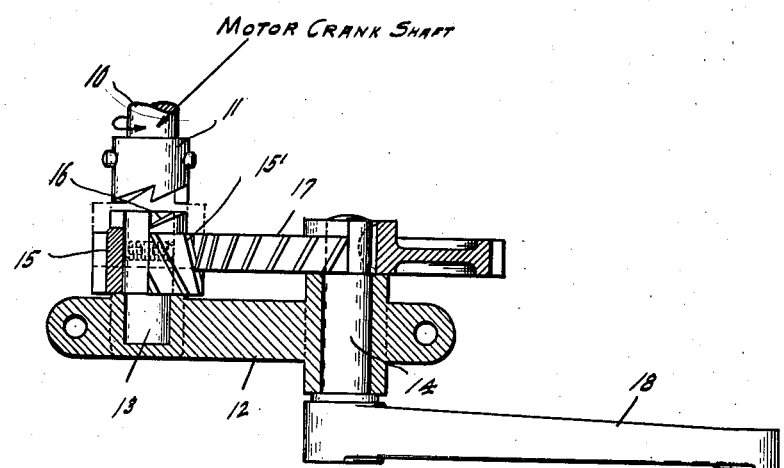
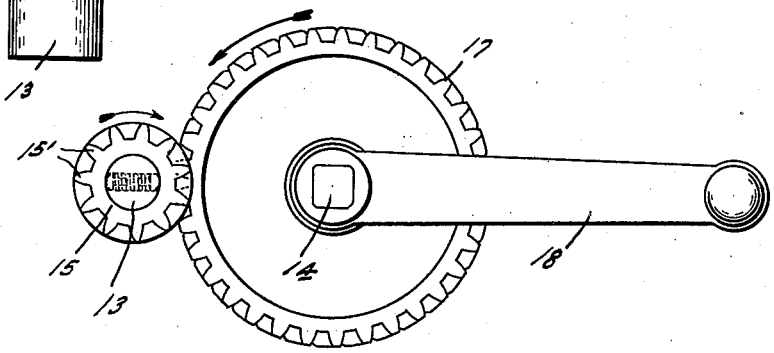
WITNESSES:
INVENTOR
Dalmar T. Brownlee,
ATTORNEYS

UNITED STATES PATENT OFFICE.

DALMAR T. BROWNLEE, OF INDIANAPOLIS, INDIANA, ASSIGNOR TO THE F. W. SPACKE MACHINE COMPANY, OF INDIANAPOLIS, INDIANA, A CORPORATION OF INDIANA.

GEARED-UP STARTER.

1,156,863.  Specification of Letters Patent.  Patented Oct. 12, 1915.

Application filed June 5, 1914. Serial No. 843,150.

*To all whom it may concern:*

Be it known that I, DALMAR T. BROWNLEE, a citizen of the United States, residing at Indianapolis, in the county of Marion and State of Indiana, have invented a new and useful Geared-Up Starter, of which the following is a specification.

The object of my invention is to produce a starting gear for internal combustion engines of such character that it will be automatically thrown into and out of operative association with the shaft of the motor.

The accompanying drawings illustrate my invention.

Figure 1 is an elevation in partial axial section of my improved device; Fig. 2 an end elevation; and Fig. 3 a fragmentary sectional detail.

In the drawings, 10 indicates the engine shaft to which power is to be applied through my apparatus in starting it and which is subsequently to be driven under power applied from the engine. Secured to the end of shaft 10 is a ratchet toothed clutch member 11. Arranged adjacent the end of shaft 10 is a bracket 12 which carries a stud shaft 13 in alinement with shaft 10 and a shaft 14 which is parallel to shafts 10 and 13. Journaled upon the stud shaft 13 is a gear 15, the teeth 15' of which are set spirally as indicated in Fig. 1. That end of the hub of gear 15 which is adjacent clutch 11 is provided with oppositely set ratchet teeth 16 which are adapted to mesh with the teeth of a clutch member 11. The length of the hub of gear 15 is such however that the clutch teeth 16 may be entirely withdrawn from the teeth of clutch member 11. Attached to shaft 14 is a gear 17 preferably larger in diameter than the gear 15 and having spirally set teeth meshing with the teeth of gear 15, the two spirals being so set that, when driving force is applied in any manner, as by crank 18, to shaft 14 to rotate gear 17 in the direction indicated by the arrow, and a slight resistance to turning is offered by gear 15, the initial movement of gear 15 will be one of combined rotation and axial projection which will project the teeth 16 of gear 15 into the teeth of the clutch member 11, whereupon driving force will be transmitted to the shaft 10. Immediately upon a reversal of the direction of transmission of driving force between shafts 10 and 14, as when the engine starts to operate under its own power in the direction indicated by the arrow, the teeth of clutch member 11 as well as the spiral teeth of the gears 15 and 17 will operate to drive gear 15 axially so as to break the meshing of the ratchet teeth.

Gear 15 may be so fitted upon the stud shaft 13 that sufficient resistance will be offered to turning of the gear 15 to cause the operation above described but I have found it desirable to insure a sufficient resistance by providing the stud-shaft 13, within the hub of gear 15, with a diametrical pocket 21 in which is mounted a light coil spring 22 having a normal length slightly in excess of the diameter of the stud shaft, and in which are also mounted two small rivets or headed pins 23, with their heads outwardly presented and engaged by the ends of the spring 22, the arrangement being such that, when the parts are assembled in the manner indicated in Fig. 3, the heads of the rivets 23 will be urged outwardly against the interior of the bore of gear 15 with a light force sufficient to insure some turning resistance in the gear 15.

I claim as my invention:

The combination of a driving gear, a driven gear journaled upon a stud shaft, the said two gears having meshing spiral teeth and the driven gear being axially movable upon the stud shaft, and friction means arranged within the driven gear to lightly resist rotation thereof, the said friction means comprising a spring and friction block mounted in a transverse bore of the stud shaft.

In witness whereof, I have hereunto set my hand at Indianapolis, Indiana, this twenty-seventh day of May, A. D. one thousand nine hundred and fourteen.

DALMAR T. BROWNLEE.

Witnesses:
JOSEPHINE GASPER,
G. B. SCHLEY.